(12) United States Patent
Pallot et al.

(10) Patent No.: US 10,480,532 B2
(45) Date of Patent: Nov. 19, 2019

(54) COMPRESSOR STATOR VANE, AXIAL FLOW COMPRESSOR, AND GAS TURBINE

(71) Applicant: IHI Corporation, Koto-ku (JP)

(72) Inventors: Guillaume Pallot, Tokyo (JP); Dai Kato, Tokyo (JP)

(73) Assignee: IHI Corporation, Koto-ku (JP)

( * ) Notice: Subject to any disclaimer, the term of this patent is extended or adjusted under 35 U.S.C. 154(b) by 357 days.

(21) Appl. No.: 15/379,935

(22) Filed: Dec. 15, 2016

(65) Prior Publication Data

US 2017/0097011 A1 Apr. 6, 2017

Related U.S. Application Data

(63) Continuation of application No. PCT/JP2015/070638, filed on Jul. 21, 2015.

(30) Foreign Application Priority Data

Aug. 12, 2014 (JP) ................................. 2014-164158

(51) Int. Cl.
*F01D 5/14* (2006.01)
*F04D 29/54* (2006.01)
(Continued)

(52) U.S. Cl.
CPC ............ *F04D 29/542* (2013.01); *F01D 9/041* (2013.01); *F02C 3/04* (2013.01); *F04D 19/02* (2013.01);
(Continued)

(58) Field of Classification Search
CPC .......... F01D 5/141; F01D 5/143; F01D 5/145; F01D 5/147; Y02T 50/673; F04D 29/324; F04D 29/544
See application file for complete search history.

(56) References Cited

U.S. PATENT DOCUMENTS 4,431,376 A * 2/1984 Lubenstein ............. F01D 5/141
  416/223 A
5,088,892 A * 2/1992 Weingold ................ F01D 5/145
  415/193

(Continued)

FOREIGN PATENT DOCUMENTS

EP 0 441 097 A1 8/1991
EP 0 745 755 A1 12/1996
(Continued)

OTHER PUBLICATIONS

Extended European Search Report dated Mar. 26, 2018 in Patent Application No. 15832373.3, 10 pages.
(Continued)

*Primary Examiner* — Carlos A Rivera
*Assistant Examiner* — Behnoush Haghighian
(74) *Attorney, Agent, or Firm* — Oblon, McClelland, Maier & Neustadt, L.L.P.

(57) ABSTRACT

Within a compressor case, a plurality of stages of high-pressure compressor stators are disposed alternately with a plurality of stages of high-pressure compressor rotors along an axial direction. Each stage of the high-pressure compressor stators includes a plurality of compressor stator vanes. Each of the compressor stator vanes has, on a camber line, a camber reference point in which $(\theta-\theta e)/\theta k$ is 50% ($\theta$, $\theta e$ and $\theta k$ represents a metal angle, an exit metal angle and a camber angle, respectively). In a vane-shaped cross-section, a distance from a leading edge to the camber reference point is set to a 26-38% chord.

3 Claims, 8 Drawing Sheets

(51) Int. Cl.
*F02C 3/04* (2006.01)
*F04D 19/02* (2006.01)
*F04D 29/32* (2006.01)
*F01D 9/04* (2006.01)

(52) U.S. Cl.
CPC ......... *F04D 29/321* (2013.01); *F04D 29/544* (2013.01); *F01D 5/141* (2013.01); *F01D 5/143* (2013.01); *F01D 5/145* (2013.01); *F01D 5/147* (2013.01); *F04D 29/324* (2013.01); *F05D 2220/32* (2013.01); *F05D 2240/35* (2013.01); *F05D 2300/10* (2013.01)

(56) References Cited

U.S. PATENT DOCUMENTS

| | | | | |
|---|---|---|---|---|
| 5,779,443 A * | 7/1998 | Haller | ............... | F01D 5/141 |
| | | | | 415/191 |
| 6,129,528 A * | 10/2000 | Bradbury | ............... | F04D 29/384 |
| | | | | 416/223 R |
| 6,375,419 B1 * | 4/2002 | LeJambre | ............... | F01D 5/141 |
| | | | | 415/191 |
| 6,709,239 B2 * | 3/2004 | Chandraker | ............ | F01D 5/141 |
| | | | | 416/238 |
| 6,899,526 B2 * | 5/2005 | Doloresco | ............... | F01D 5/141 |
| | | | | 416/223 A |
| 7,175,393 B2 * | 2/2007 | Chandraker | ............ | F01D 5/141 |
| | | | | 416/223 A |
| 7,419,353 B2 * | 9/2008 | Guemmer | ............... | F01D 5/141 |
| | | | | 415/191 |
| 7,967,571 B2 * | 6/2011 | Wood | ............... | F01D 5/141 |
| | | | | 416/243 |
| 8,087,884 B2 * | 1/2012 | Wood | ............... | F01D 5/141 |
| | | | | 415/191 |
| 8,152,459 B2 | 4/2012 | Sonoda et al. | | |
| 8,152,473 B2 * | 4/2012 | Clemen | ............... | F01D 5/141 |
| | | | | 416/241 R |
| 8,157,518 B2 * | 4/2012 | Decker | ............... | F04D 29/384 |
| | | | | 415/211.2 |
| 8,167,548 B2 * | 5/2012 | Greim | ............... | F01D 5/141 |
| | | | | 415/193 |
| 8,337,154 B2 * | 12/2012 | Decker | ............... | F04D 25/0606 |
| | | | | 415/191 |
| 8,439,646 B2 * | 5/2013 | Guemmer | ............... | F01D 5/20 |
| | | | | 415/219.1 |
| 8,523,531 B2 * | 9/2013 | Micheli | ............... | F01D 5/141 |
| | | | | 416/223 A |
| 8,678,757 B2 * | 3/2014 | Li | ............... | F04D 29/324 |
| | | | | 415/191 |
| 8,684,698 B2 * | 4/2014 | Breeze-Stringfellow | ............... | |
| | | | | F01D 5/141 |
| | | | | 416/223 A |
| 8,708,660 B2 * | 4/2014 | Micheli | ............... | F01D 5/141 |
| | | | | 416/238 |
| 8,747,072 B2 * | 6/2014 | Micheli | ............... | F01D 5/141 |
| | | | | 416/238 |
| 8,784,042 B2 * | 7/2014 | Clemen | ............... | F01D 5/141 |
| | | | | 415/144 |
| 8,864,457 B2 * | 10/2014 | Malandra | ............... | F01D 5/141 |
| | | | | 415/191 |
| 9,291,059 B2 * | 3/2016 | Micheli | ............... | F01D 5/141 |
| 9,458,720 B2 * | 10/2016 | Cellier | ............... | F01D 5/143 |
| 9,464,526 B2 * | 10/2016 | Cellier | ............... | F01D 5/143 |
| 9,797,267 B2 * | 10/2017 | Lohaus | ............... | F01D 5/141 |
| 2006/0165520 A1 * | 7/2006 | Guemmer | ............... | F01D 5/141 |
| | | | | 415/191 |
| 2007/0140837 A1 * | 6/2007 | Guemmer | ............... | F01D 5/141 |
| | | | | 415/160 |
| 2008/0131271 A1 | 6/2008 | Wood et al. | | |
| 2009/0226322 A1 | 9/2009 | Clemen | | |
| 2009/0257866 A1 * | 10/2009 | Greim | ............... | F01D 5/141 |
| | | | | 415/208.1 |
| 2011/0058931 A1 | 3/2011 | Domercq et al. | | |
| 2011/0081252 A1 | 4/2011 | Li | | |
| 2011/0158798 A1 | 6/2011 | Kirtley | | |
| 2012/0163965 A1 | 6/2012 | Takahashi et al. | | |
| 2013/0202444 A1 | 8/2013 | Wunderer | | |
| 2014/0219792 A1 | 8/2014 | Topol et al. | | |

FOREIGN PATENT DOCUMENTS

| | | | | |
|---|---|---|---|---|
| EP | 2 133 573 A1 | 12/2009 | | |
| GB | 2 435 309 A | 8/2007 | | |
| GB | 2435309 A | * 8/2007 | ............ | F01D 5/142 |
| JP | 7-12094 | 1/1995 | | |
| JP | 8-135597 | 5/1996 | | |
| JP | 9-105310 | 4/1997 | | |
| JP | 11-343998 | 12/1999 | | |
| JP | 2000-345997 | 12/2000 | | |
| JP | 2001-165095 | 6/2001 | | |
| JP | 2001-234893 | 8/2001 | | |
| JP | 2010-203456 | 9/2010 | | |
| JP | 2011-94500 | 5/2011 | | |
| JP | 2011-137463 | 7/2011 | | |
| JP | 2011-525952 | 9/2011 | | |
| JP | 2012-137072 | 7/2012 | | |
| JP | 2013-76344 | 4/2013 | | |
| JP | 2014-111941 | 6/2014 | | |

OTHER PUBLICATIONS

International Search Report dated Oct. 27, 2015 in PCT/JP2015/070638 filed on Jul. 21, 2015 (with English translation).

Written Opinion dated Oct. 27, 2015 in PCT/JP2015/070638 filed on Jul. 21, 2015.

* cited by examiner

COMPRESSOR STATOR VANE, AXIAL FLOW COMPRESSOR, AND GAS TURBINE

CROSS REFERENCE TO RELATED APPLICATIONS

This application is a continuation application of International Application No. PCT/JP2015/070638, filed on Jul. 21, 2015, which claims priority to Japanese Patent Application No. 2014-164158, filed on Aug. 12, 2014, the entire contents of which are incorporated by reference herein.

BACKGROUND

1. Technical Field

The present disclosure relates to an axial flow compressor and a gas turbine which compress a fluid such as air along an axial direction and to a compressor stator vane used in these.

2. Description of the Related Art

In recent years, various developments have been performed on axial flow compressors used in a gas turbine and the like, and the configuration of a general axial flow compressor is as follows.

The general axial flow compressor includes a cylindrical compressor case, and the compressor case is extended along an axial direction (the axial direction of the axial flow compressor). In addition, an annular main flow path (core flow path) for circulating a fluid along the axial direction is formed inside the compressor case.

Within the compressor case, a plurality of stages of compressor rotors are rotatably disposed along the axial direction. Furthermore, each stage of the compressor rotor includes a compressor disc which can be rotated around its shaft center (the shaft center of the compressor rotor), and the outer circumferential surface (hub surface) of the compressor disc constitutes a part of a wall surface of the main flow path on the inner side in a radial direction. Moreover, the outer circumferential surface of each compressor disc is integrally provided with a plurality of compressor rotor blades for compressing the fluid, at regular intervals in a circumferential direction (the outer circumferential surface of the compressor disc in the circumferential direction), and the plurality of compressor rotor blades are located within the main flow path.

Within the compressor case, a plurality of stages of compressor stators are disposed alternately with the plurality of stages of compressor rotors along the axial direction. Additionally, each stage of the compressor stator includes a plurality of compressor stator vanes which are provided within the main flow path at regular intervals in a circumferential direction (the circumferential direction of the main flow path) and which rectify the flow of the fluid.

Note that prior art related to the present disclosure is shown in Japanese Patent Application Laid-Open Publication Nos. 2013-76344 and 2012-137072.

SUMMARY

Incidentally, it is known that a total pressure loss (profile loss) due to the shape of the vane of a compressor stator vane and a total pressure loss (wake mixing loss) due to a wake (the wake caused by a compressor rotor blade) produced on the immediate downstream side of the trailing edge of the compressor rotor blade are factors for lowering the compressor efficiency of an axial flow compressor. Furthermore, in recent years, in the fields of a gas turbine and the like, the enhancement of the compressor efficiency of an axial flow compressor has been significantly required.

Accordingly, it is an object of the present disclosure to provide a compressor stator vane, an axial flow compressor and a gas turbine which reduce a total pressure loss and the like due to the shape of the vane of the compressor stator vane and which thereby can enhance the compressor efficiency.

According to a first aspect of the present disclosure, there is provided a compressor stator vane that is used in an axial flow compressor which compresses a fluid along an axial direction and that rectifies a flow of the fluid, wherein the compressor stator vane includes, on a camber line, a camber reference point in which a ratio of an angle obtained by subtracting an exit metal angle from a metal angle to a camber angle is 50%, and a distance from a leading edge to the camber reference point is set to a 26-38% chord.

According to a second aspect of the present disclosure, there is provided an axial flow compressor that compresses a fluid along an axial direction, the axial flow compressor including: a cylindrical compressor case inside which an annular main flow path (core flow path) for circulating the fluid along the axial direction is formed; a plurality of stages of compressor rotors that are rotatably provided within the compressor case along the axial direction and that include: a compressor disc whose outer circumferential surface (hub surface) constitutes a part of a wall surface of the main flow path on an inner side in a radial direction and which can be rotated; and a plurality of compressor rotor blades which are provided at intervals on the outer circumferential surface of the compressor disc along a circumferential direction (circumferential direction of the outer circumferential surface of the compressor disc) thereof and which are located within the main flow path; and a plurality of stages of compressor stators which are disposed alternately with the plurality of stages of compressor rotors within the compressor case along the axial direction and which include a plurality of compressor stator vanes that are arranged at intervals within the main flow path in the circumferential direction (circumferential direction of the main flow path) thereof and that rectify a flow of the fluid, wherein each of the compressor stator vanes of at least any stage of the compressor stator among the plurality of stages of compressor stators has, on a camber line, a camber reference point in which a ratio of an angle obtained by subtracting an exit metal angle from a metal angle to a camber angle is 50%, and a distance from a leading edge to the camber reference point is set to a 26-38% chord.

According to a third aspect of the present disclosure, there is provided a gas turbine that exhausts (jets) a high-temperature and high-pressure combustion gas to thereby generate a propulsion force or a rotating force, the gas turbine including the axial flow compressor according to the second aspect.

Note that the "fluid" in the specification of the present application and the scope of claims includes a meaning of the "fluid" containing a gas such as air, and the "axial direction" refers to the axial direction of the axial flow compressor unless otherwise particularly specified. In addition, the "leading edge" refers to a portion which is an end edge of the fluid on the upstream side in the direction of the main flow path when the compressor stator vane is used in the axial flow compressor.

Furthermore, the "provided" in the specification of the present application and the scope of claims includes a meaning of not only "directly provided" but also "indirectly provided via another member", and the "integrally provided" includes a meaning of "integrally formed".

Moreover, the "gas turbine" in the specification of the present application and the scope of claims includes a meaning of an aviation gas turbine (jet engine) used in an airplane and an industrial gas turbine used in an industrial machine.

In the present disclosure, it is possible to sufficiently reduce the total pressure loss due to the vane shape of the compressor stator vane and the total pressure loss due to the wake caused by the compressor rotor blade, while preventing the stall of the axial flow compressor. Accordingly, it is possible to enhance the compressor efficiency of the axial flow compressor while sufficiently ensuring the operation range of the axial flow compressor.

DESCRIPTION OF THE EMBODIMENTS

The present disclosure is based on the following findings which are newly obtained by the inventor of the present application. Namely, when, in a vane-shaped cross-section of a compressor stator vane, a distance from the leading edge of the compressor stator vane to a predetermined reference point on a camber line is set to a 26-38% chord, it is possible to sufficiently reduce a total pressure loss due to the vane shape of the compressor stator vane and a total pressure loss due to the wake caused by the compressor rotor blade, while preventing the stall of the axial flow compressor. Here, the predetermined reference point refers to a point at which a ratio of an angle obtained by subtracting an exit metal angle from a metal angle to a camber angle is 50%.

An embodiment and examples of the present disclosure will then be described with reference to drawings.

In the figures, "F" represents a forward direction (the upstream side in the direction of a main flow), "R" represents a backward direction (the downstream side in the direction of the main flow), "SD" represents an axial direction, "RD" represents a radial direction, "RDi" represents the inside in the radial direction, "RDo" represents the outside in the radial direction and "CD" represents the rotation direction of a rotor such as a high-pressure compressor rotor, respectively.

Embodiment

Figure 4:
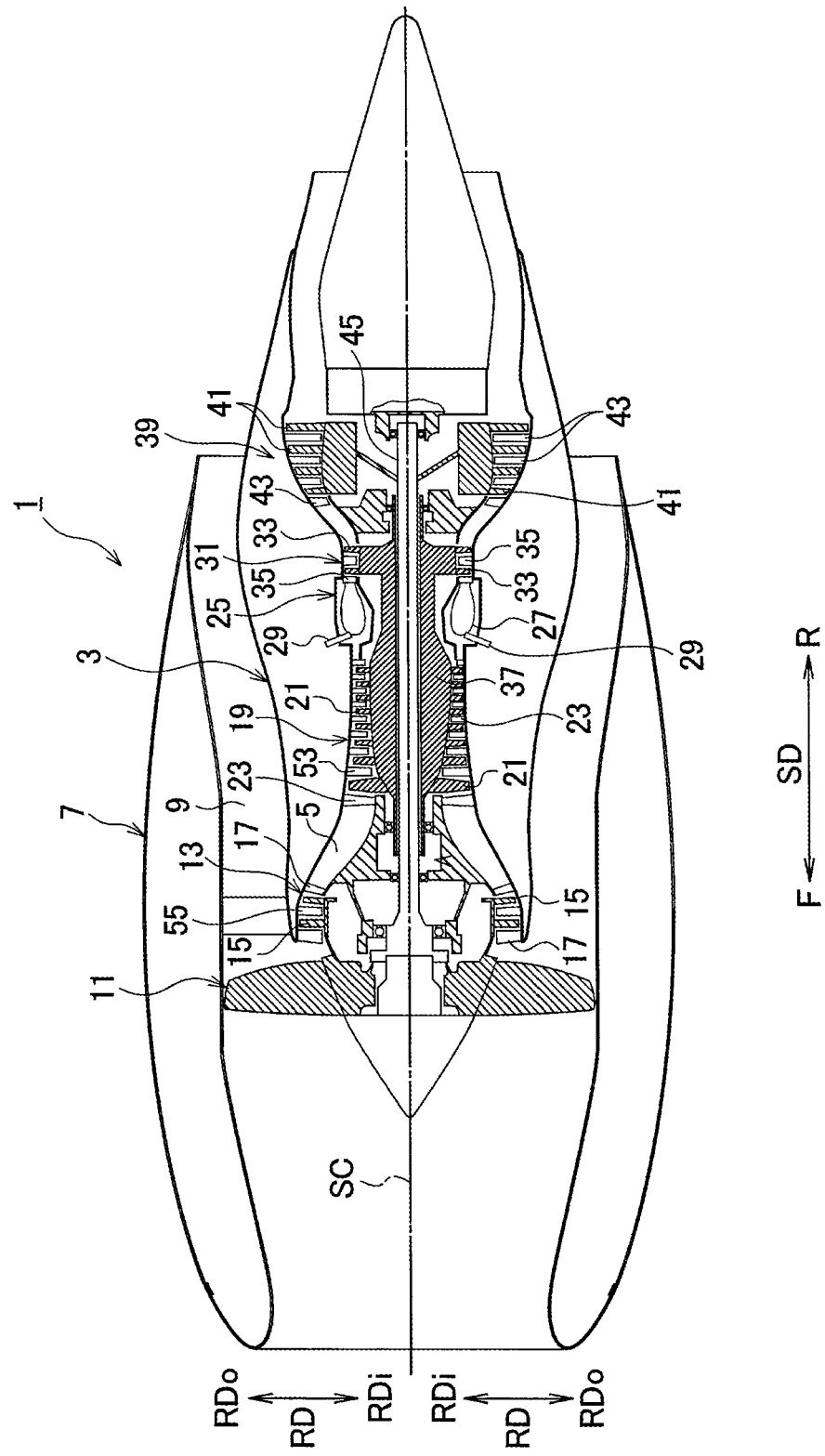
FIG. 4 is a side cross-sectional view of an aviation gas turbine according to the embodiment of the present disclosure.

As shown in FIG. 4, an aviation gas turbine (jet engine) 1 according to the present embodiment is used in an aircraft (not illustrated), and is a device which exhausts (jets) a high-temperature and high-pressure combustion gas in a backward direction to thereby generate a propulsion force. The aviation gas turbine 1 includes a cylindrical core cowl (gas turbine inner cylinder) 3. An annular main flow path (core flow path) 5 for circulating air and the like (the air and the combustion gas) in an axial direction (the axial direction of the aviation gas turbine 1) is formed inside the core cowl 3. Furthermore, a cylindrical nacelle (engine outer cylinder) 7 is provided so as to surround the core cowl 3, outside the core cowl 3. An annular bypass flow path 9 for circulating the air along the axial direction is formed between the inner circumferential surface of the nacelle 7 and the outer circumferential surface of the core cowl 3.

A front end portion (tip end portion) of the core cowl 3 is rotatably provided with a fan (fan rotor) 11 which takes in the air to the main flow path 5 and the bypass flow path 9. The back side (the immediate downstream side in the direction of the main flow) of the fan 11 within the core cowl 3 is provided with a low-pressure compressor 13 which is one of axial flow compressors. The low-pressure compressor 13 compresses (compresses with a low pressure) the air taken into the main flow path 5 along the axial direction (the axial direction of the aviation gas turbine 1, in other words, the low-pressure compressor 13). Furthermore, the low-pressure compressor 13 includes a plurality of stages of low-pressure compressor rotors 15 which are rotatably provided within the core cowl 3 along the axial direction, and a plurality of stages of low-pressure compressor stators 17 which are disposed alternately with the plurality of stages of low-pressure compressor rotors 15 within the core cowl 3 along the axial direction.

The back side (the downstream side in the direction of the main flow) of the low-pressure compressor 13 within the core cowl 3 is provided with a high-pressure compressor 19 which is one of axial flow compressors. The high-pressure compressor 19 further compresses (compresses with a high pressure) the air compressed by the low-pressure compressor 13 along the axial direction (the axial direction of the aviation gas turbine 1, in other words, the high-pressure compressor 19). The high-pressure compressor 19 includes a plurality of stages of high-pressure compressor rotors 21 which are rotatably provided within the core cowl 3 along the axial direction, and a plurality of stages of high-pressure compressor stators 23 which are disposed alternately with the plurality of stages of high-pressure compressor rotors 21 within the core cowl 3 along the axial direction. Note that the detailed configuration of the high-pressure compressor 19 will be described later.

The back side of the high-pressure compressor 19 within the core cowl 3 is provided with an annular combustor 25 which burns a fuel with the compressed air. Furthermore, the combustor 25 includes a hollow annular combustor linear 27, a plurality of fuel nozzles 29 which are arranged at intervals in the front side portion of the combustor linear 27 along its circumferential direction (the circumferential direction of the combustor linear 27) and which jet the fuel, and an ignition plug (not illustrated) which is provided in an appropriate position of the combustor linear 27 and which lights (ignites) the fuel.

The back side of the combustor 25 within the core cowl 3 is provided with a high-pressure turbine 31. The high-pressure turbine 31 is driven by the expansion of the combustion gas from the combustor 25 to thereby drive the high-pressure compressor 19 in a coordinated manner. In addition, the high-pressure turbine 31 includes a plurality of stages (two stages) of high-pressure turbine rotors 33 which are rotatably provided along an axial direction (the axial direction of the aviation gas turbine 1, in other words, the high-pressure turbine 31) within the core cowl 3, and high-pressure turbine stators 35 which are disposed alternately with the plurality of stages of high-pressure turbine rotors 33 along the axial direction within the core cowl 3. Furthermore, the plurality of stages of high-pressure turbine rotors 33 are integrally coupled to the plurality of stages of high-pressure compressor rotors 21 via a hollow first turbine shaft 37 arranged on the shaft center SC of the aviation gas turbine 1.

The back side of the high-pressure turbine 31 within the core cowl 3 is provided with a low-pressure turbine 39. The low-pressure turbine 39 is driven by the expansion of the combustion gas to thereby drive the low-pressure compressor 13 and the fan 11 in a coordinated manner. In addition, the low-pressure turbine 39 includes a plurality of stages of low-pressure turbine rotors 41 which are rotatably disposed along an axial direction (the axial direction of the aviation gas turbine 1, in other words, the low-pressure turbine 39) within the core cowl 3, and a plurality of stages of low-pressure turbine stators 43 which are disposed alternately with the plurality of stages of low-pressure turbine rotors 41 along the axial direction within the core cowl 3. Here, the plurality of stages of low-pressure turbine rotors 41 are integrally coupled to the plurality of stages of low-pressure compressor rotors 15 and the fan 11 via a hollow second turbine shaft 45 coaxially arranged inside the hollow first turbine shaft 37.

Note that, in FIG. 4, the rotor blades of the fan 11, the low-pressure compressor 13, the high-pressure compressor 19, the high-pressure turbine 31 and the low-pressure turbine 39 are hatched so as to be distinguished from the stator vanes.

Next, the detailed configuration of the high-pressure compressor 19 according to the embodiment of the present disclosure will be described.

Figure 3:
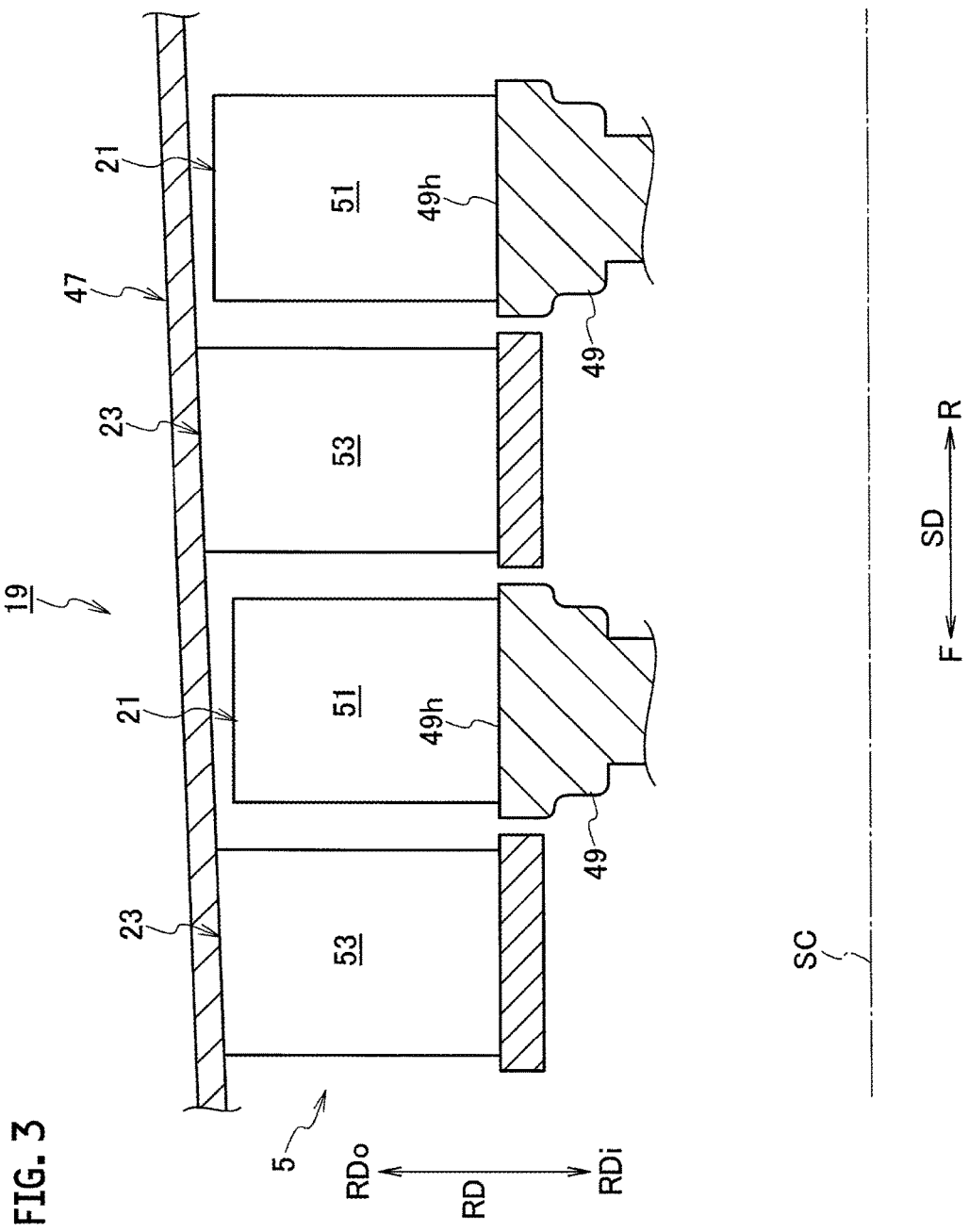
FIG. 3 is a schematic side cross-sectional view of a high-pressure compressor according to the embodiment of the present disclosure.

As shown in FIG. 3, the high-pressure compressor 19 according to the embodiment of the present disclosure further compresses, as previously described, the air compressed by the low-pressure compressor 13 along the axial direction (the axial direction of the high-pressure compressor 19). In addition, the high-pressure compressor 19 includes a cylindrical compressor case 47. The compressor case 47 forms a part of the core cowl 3 and is extended along the axial direction (the axial direction of the high-pressure compressor 19). The main flow path 5 (a part of the main flow path 5) previously described is formed inside the compressor case 47.

As previously described, a plurality of stages (only two stages are shown in FIG. 3) of high-pressure compressor rotors (compressor rotors) 21 are rotatably disposed within the compressor case 47 along the axial direction. In addition, each stage of the high-pressure compressor rotor 21 includes a compressor disc 49 which can be rotated around the shaft center (the shaft center of the high-pressure compressor rotor 21) SC. The outer circumferential surface (hub surface) 49$h$ of the compressor disc 49 constitutes a part of a wall surface of the main flow path 5 on the inner side in the radial direction. Additionally, compressor rotor blades 51 for compressing the air are integrally formed at regular intervals on the outer circumferential surface 49$h$ of the compressor disc 49, in the circumferential direction (the circumferential direction of the outer circumferential surface 49$h$ of the compressor disc 49), and the individual compressor rotor blades 51 are located within the main flow path 5. The compressor rotor blades 51 may be integrally formed with the outer circumferential surface 49$h$ of the compressor disc 49 or may be formed (prepared) as members different from the compressor disc 49 and be provided (fixed) on the outer circumferential surface 49$h$.

As previously described, within the compressor case 47, the plurality of stages (only two stages are shown in FIG. 3) of high-pressure compressor stators (compressor stators) 23 are disposed alternatively with the plurality of stages of high-pressure compressor rotors 21, along the axial direction. In addition, each stage of the high-pressure compressor stator 23 includes, within the main flow path 5, a plurality of compressor stator vanes 53 which are arranged along the circumferential direction (the circumferential direction of the main flow path 5) thereof at regular intervals and which rectify the flow of the air (compressed air).

Figure 1A:
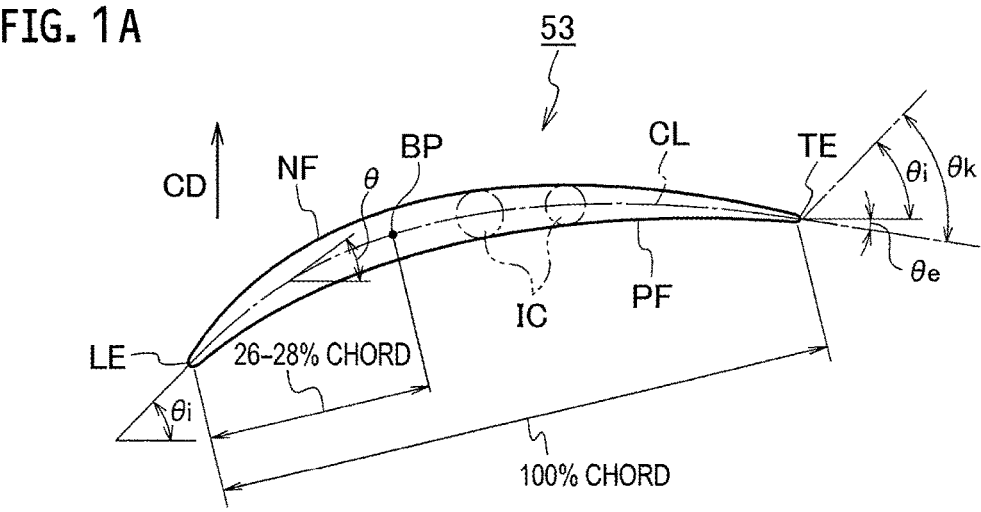
FIG. 1A is a diagram showing a vane-shaped cross-section of a compressor stator vane according to an embodiment of the present disclosure.
Figure 1B:
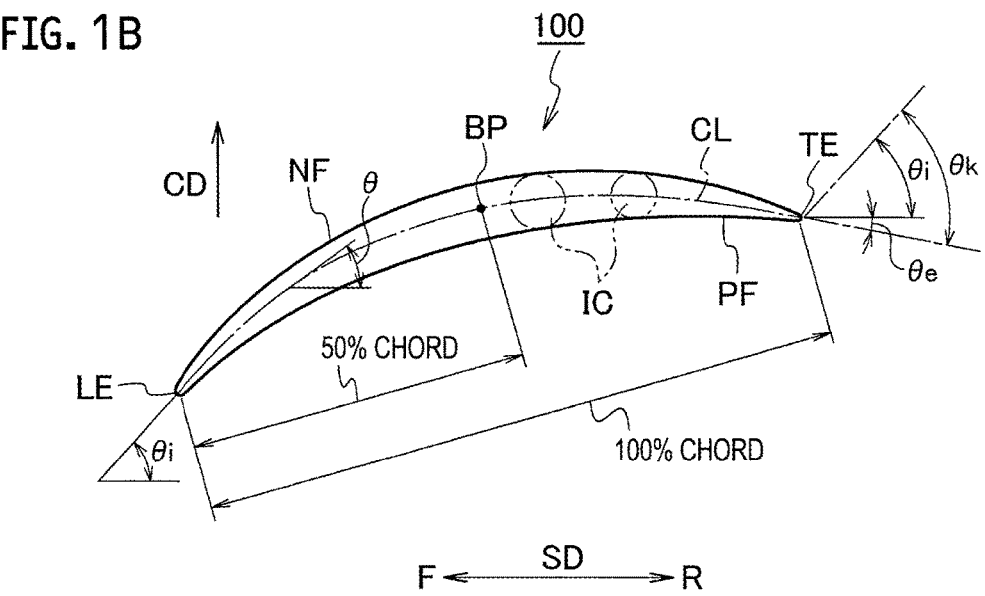
FIG. 1B is a diagram showing a vane-shaped cross-section of a compressor stator vane according to a conventional example.
Figure 2:
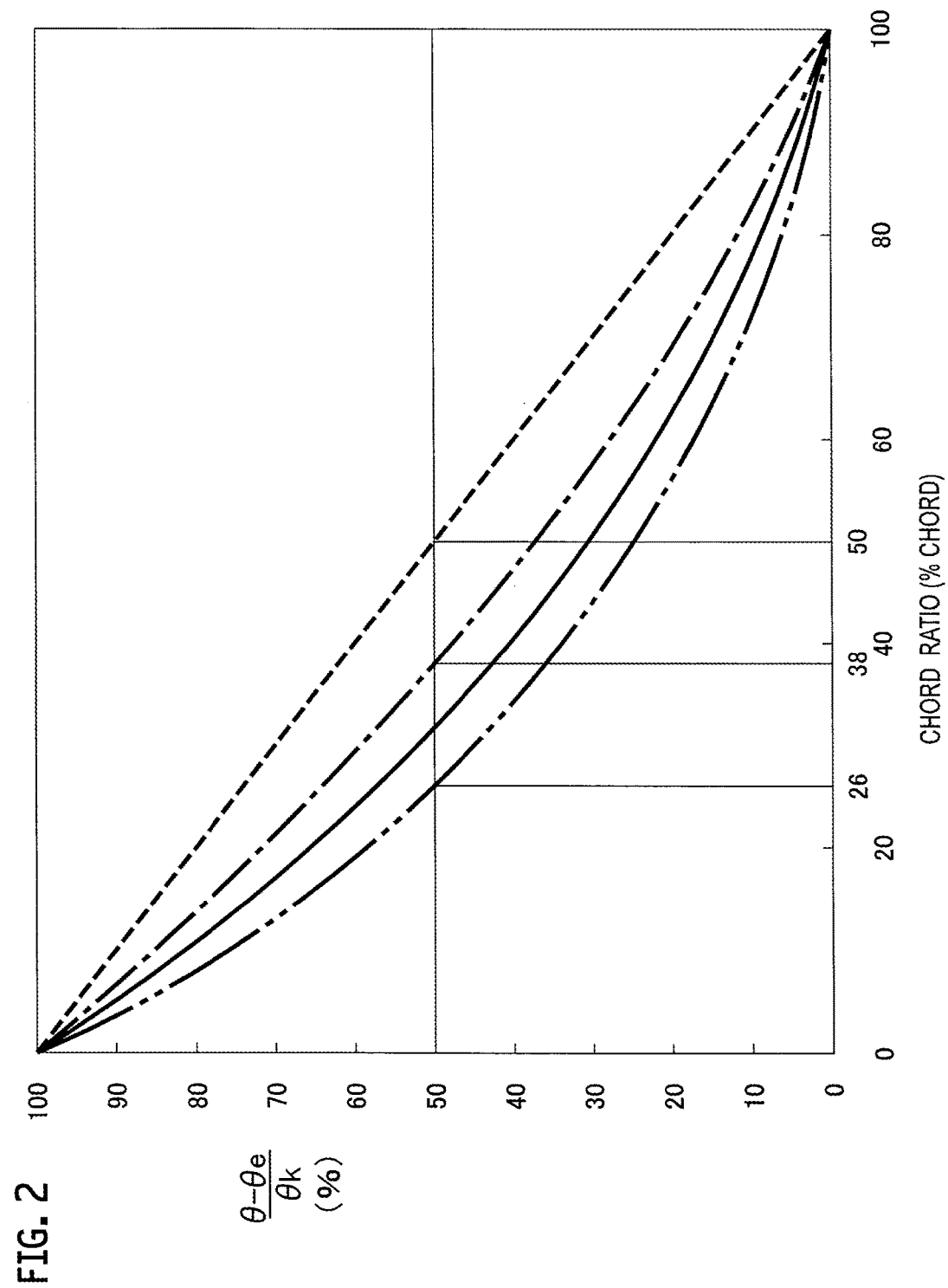
FIG. 2 is a diagram showing a relationship between a predetermined ratio $(\theta-\theta e)/\theta k$ and a chord ratio in the compressor stator vane according to the embodiment of the present disclosure.

In FIG. 2, a relationship between a ratio $(\theta-\theta e)/\theta k$ and a chord ratio in the compressor stator vane 53 is illustrated by a solid line, an alternate long and short dash line, and an alternate long and two short dashes line. Here, $\theta$ represents a metal angle, $\theta e$ represents an exit metal angle, and $\theta k$ represents a camber angle. The definitions of the respective angles will be described later. In addition, the compressor stator vane 53 has, on a camber line CL, a camber reference point BP in which a predetermined ratio $(\theta-\theta e)/\theta k$ is 50%. In a vane-shaped cross-section, a distance from a leading edge LE to the camber reference point BP is set to a 26-38% chord. The reason why the predetermined distance is set equal to or more than a 26% chord is that when the predetermined distance is less than the 26% chord, it is likely that the curvature of a suction surface NF of the compressor stator vane 53 on the side of the leading edge LE becomes excessive to extend the peeling of the suction surface NF of the compressor stator vane 53 on the side of the leading edge LE. The reason why the predetermined distance is set equal to or less than a 38% chord is that when the predetermined distance exceeds the 38% chord, it becomes not possible to sufficiently reduce a total pressure loss due to the vane shape of the compressor stator vane 53 and a total pressure loss due to the wake caused by the compressor rotor blade 51. Furthermore, the predetermined distance is set to the 26-38% chord, and thus the compressor stator vane 53 has gentler suction surface NF on the side of the trailing edge TE and has larger curvature of the suction surface NF on the side of the leading edge LE than a compressor stator vane 100 (see FIG. 1B) according to a conventional example. Note that, in FIG. 1A and FIG. 1B, the hatching of the vane-shaped cross-section is omitted. In the compressor stator vane 100 according to the conventional example, the relationship between the ratio $(\theta-\theta e)/\theta k$ and the chord ratio is indicated by a dotted line in, for example, FIG. 2.

Here, the "metal angle $\theta$" refers to an angle formed by a tangential direction and an axial direction at an arbitrary position on the camber line CL. The "camber line CL" refers to a line which connects, in the vane-shaped cross-section, a pressure surface PF and the center of an inscribed circle IC inscribed in a suction surface NF. In other words, the "camber line CL" refers to a center line of the thickness of the vane from the leading edge LE to the trailing edge TE. In addition, the "camber angle $\theta k$" refers to an angle $(\theta i+\theta e)$ obtained by adding an entrance metal angle $\theta i$ to the exit metal angle $\theta e$. The "entrance metal angle $\theta i$" refers to an angle formed by a tangential direction and an axial direction of the leading edge LE which is the leading edge on the camber line CL. The "exit metal angle $\theta e$" refers to an angle formed by a tangential direction and an axial direction of the trailing edge TE which is the trailing edge on the camber line CL. Furthermore, the "chord ratio" refers to a ratio of a chord length to a length in a chord direction from the leading edge LE to an arbitrary position on the camber line CL. The chord ratio in the leading edge LE is a 0% chord, and the chord ratio in the trailing edge TE is a 100% chord.

Although not illustrated, the configuration applied to the compressor stator vane 53 in each stage of the high-pressure compressor stator 23 is applied to a compressor stator vane 55 (see FIG. 4) in each stage of the low-pressure compressor stator 17.

Subsequently, the actions and effects of the embodiment of the present disclosure will be described.

The high-pressure compressor 19 is driven by the operation of an appropriate stator device (not illustrated), the plurality of stages of high-pressure compressor rotors 21 are rotated and thus the plurality of stages of high-pressure compressor rotors 21 and the plurality of stages of high-pressure compressor stators 23 are operated in a coordinated manner, with the result that the air taken into the main flow path 5 is compressed along the axial direction. Then, the fuel is burned in the compressed air by the combustor 25, and thus the high-pressure turbine 31 and the low-pressure turbine 39 are driven by the expansion of the combustion gas, the high-pressure compressor 19 is driven by the high-pressure turbine 31 in a coordinated manner, and the fan 11 and the low-pressure compressor 13 are driven by the low-pressure turbine 39 in a coordinated manner. Furthermore, a series of operations (the drive of the fan 11, the drive of the low-pressure compressor 13, the drive of the high-pressure compressor 19, the combustion by the combustor 25, the drive of the high-pressure turbine 31 and the drive of the low-pressure turbine 39) described above are continuously performed, and thus it is possible to appropriately operate the aviation gas turbine 1. Accordingly, the high-temperature and high-pressure combustion gas can be exhausted from the main flow path 5 as a core jet in the backward direction, and the low-temperature air can be exhausted from the bypass flow path 9 as a bypass jet in the backward direction, with the result that it is possible to generate a propulsion force.

Since the distance from the leading edge LE of the compressor stator vane 53 in each stage of the high-pressure compressor stator 23 to the camber reference point BP is set to the 26-38% chord, it is possible to apply the novel findings described above to the high-pressure compressor 19. Accordingly, it is possible to sufficiently reduce the total pressure loss (profile loss) due to the vane shape of the compressor stator vane 53 and the total pressure loss (wake mixing loss) due to the wake caused by the compressor rotor blade 51, while preventing the stall of the high-pressure compressor 19. In the same way, since the configuration applied to the compressor stator vane 53 in each stage of the high-pressure compressor stator 23 is applied to the compressor stator vane 55 in each stage of the low-pressure compressor stator 17, it is possible to sufficiently reduce the total pressure loss or the like due to the vane shape of the compressor stator vane 55 while preventing the stall of the low-pressure compressor 13.

Therefore, according to the embodiment of the present disclosure, it is possible to sufficiently reduce the total pressure loss due to the vane shape of the compressor stator vane 53, the total pressure loss due to the wake caused by the compressor rotor blade 51 and the like, while preventing the stall of the high-pressure compressor 19 and the like, with the result that it is possible to enhance the compressor efficiency of the high-pressure compressor 19 and the like while sufficiently ensuring the operation range of the high-pressure compressor 19 and the like. In other words, according to the embodiment of the present disclosure, it is possible to enhance the turbine efficiency of the aviation gas turbine 1 while sufficiently hiding the operation range of the aviation gas turbine 1.

Note that the present disclosure is not limited to the description of the embodiment discussed above, and for example, the present disclosure can be practiced in various aspects such as the application of the configuration applied to the high-pressure compressor 19 and the like of the aviation gas turbine 1 to the axial flow compressor (not illustrated) of an industrial gas turbine (not illustrated). The scope of the right included in the present disclosure is not limited to the embodiment described above.

Examples

Figure 5:
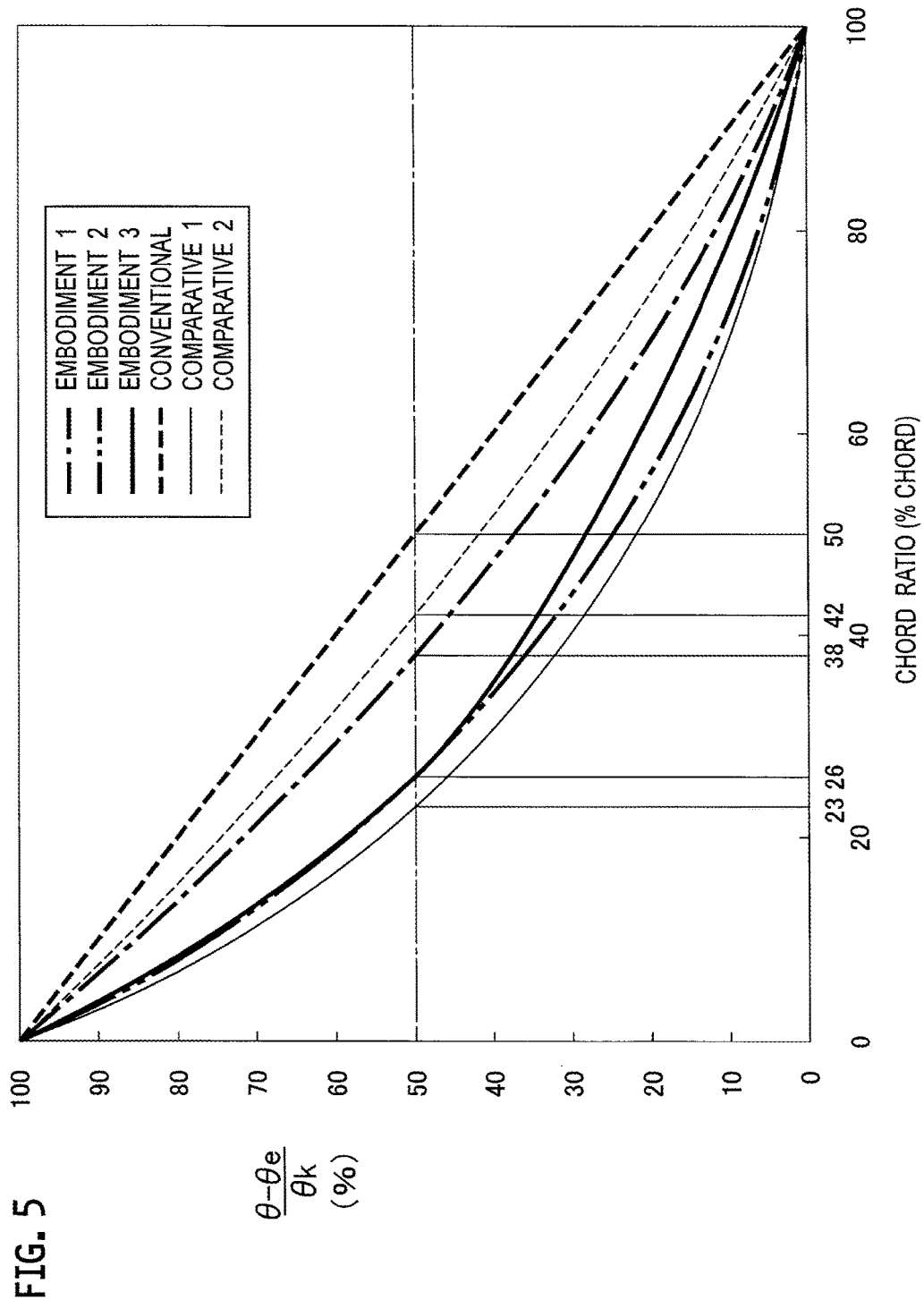
FIG. 5 is a diagram showing a relationship between the predetermined ratio $(\theta-\theta e)/\theta k$ and the chord ratio in compressor stator vanes according to embodiment 1 (example 1), embodiment 2 (example 2), embodiment 3 (example 3), a conventional example, comparative example 1 and comparative example 2.

As shown in FIG. 5, in a compressor stator vane according to embodiment 1 (example 1), a distance from the leading edge to the camber reference point is set to a 26% chord, and the relationship between the ratio $(\theta-\theta e)/\theta k$ and the chord ratio is indicated by a solid line. In a compressor stator vane according to embodiment 2 (example 2), the distance from the leading edge to the camber reference point is set to the 26% chord, and the relationship between the ratio $(\theta-\theta e)/\theta k$ and the chord ratio is indicated by an alternate long and short dash line. In a compressor stator vane according to embodiment 3 (example 3), the distance from the leading edge to the camber reference point is set to a 38% chord, and the relationship between the ratio $(\theta-\theta e)/\theta k$ and the chord ratio is indicated by a solid line.

In a compressor stator vane according to a conventional example, the distance from the leading edge to the camber reference point is set to a 50% chord, and the relationship between the ratio $(\theta-\theta e)/\theta k$ and the chord ratio is indicated by a broken line. In a compressor stator vane according to comparative example 1, the distance from the leading edge to the camber reference point is set to a 23% chord, and the relationship between the ratio $(\theta-\theta e)/\theta k$ and the chord ratio is indicated by a fine solid line. In a compressor stator vane according to comparative example 2, the distance from the leading edge to the camber reference point is set to a 42% chord, and the relationship between the ratio $(\theta-\theta e)/\theta k$ and the chord ratio is indicated by a fine broken line.

Figure 6:
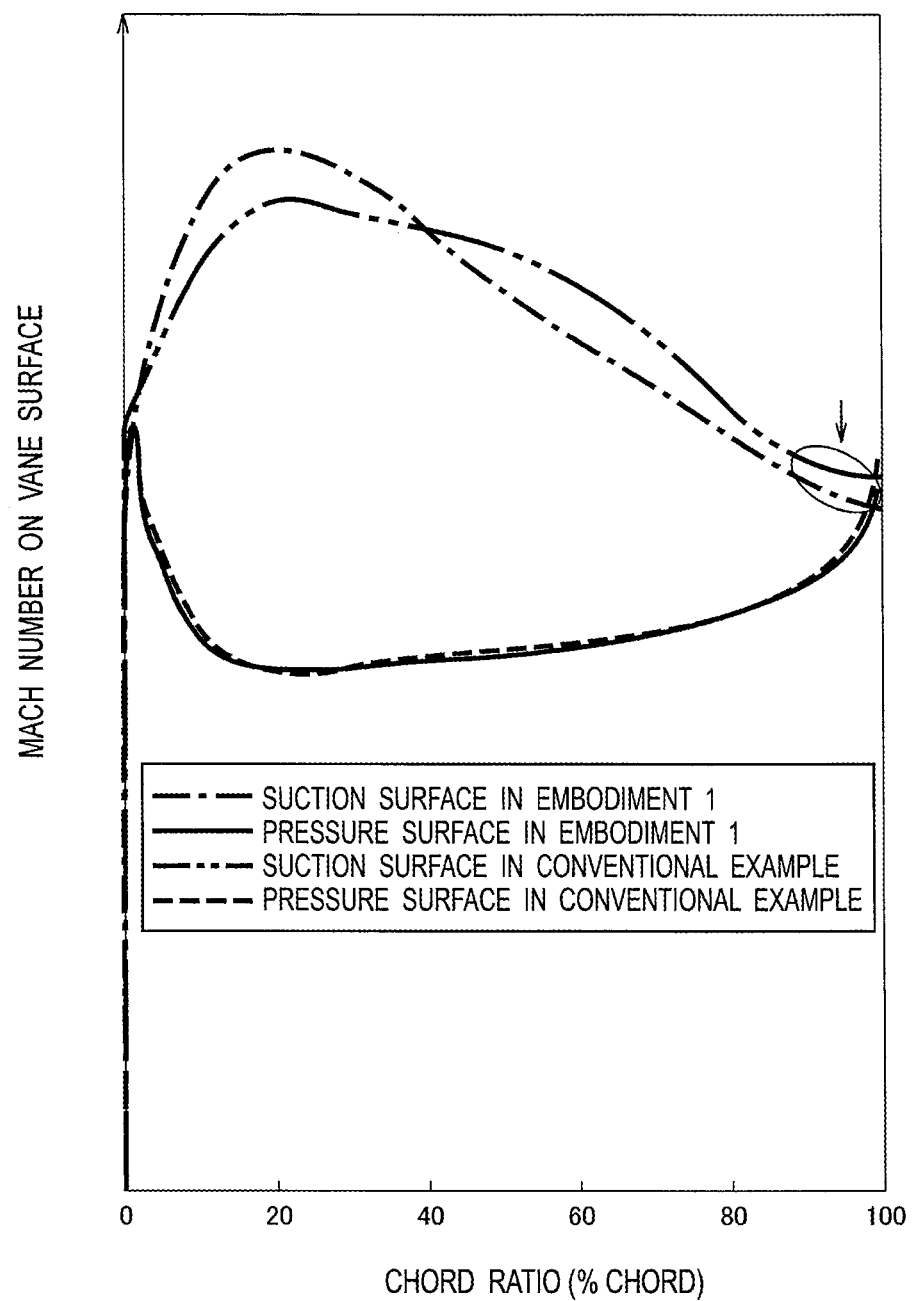
FIG. 6 is a diagram showing a relationship between the Mach number on the surfaces of the vane in a 50% span and a chord ratio in embodiment 1 and the conventional example.

When the axial flow compressor using the compressor stator vane according to embodiment 1 was operated (in the case of embodiment 1), and when the axial flow compressor using the compressor stator vane according to the conventional example was operated (in the case of the conventional example), Computational Fluid Dynamics analysis (CFD) was performed on a relationship between the Mach number on the surfaces of the vane (pressure surface and the suction surface) in a 50% span and a chord ratio under the condition of the same discharge angle (specifically, the discharge angle was zero), and the results thereof summarized are shown in FIG. 6. Namely, it has been found that in the case of the conventional example, it is not possible to perform sufficient deceleration on the trailing edge side (the part enclosed by a fine solid line indicated by an arrow) on the suction surface, whereas in the case of embodiment 1, it is possible to perform sufficient deceleration also on the trailing edge side on the suction surface. It can be considered that this is because in the case of embodiment 1, a deviation (an angle obtained by subtracting the exit metal angle from the discharge angle) was decreased and the peeling on the trailing edge side on the suction surface was suppressed as compared with the case of the conventional example.

Figure 7:
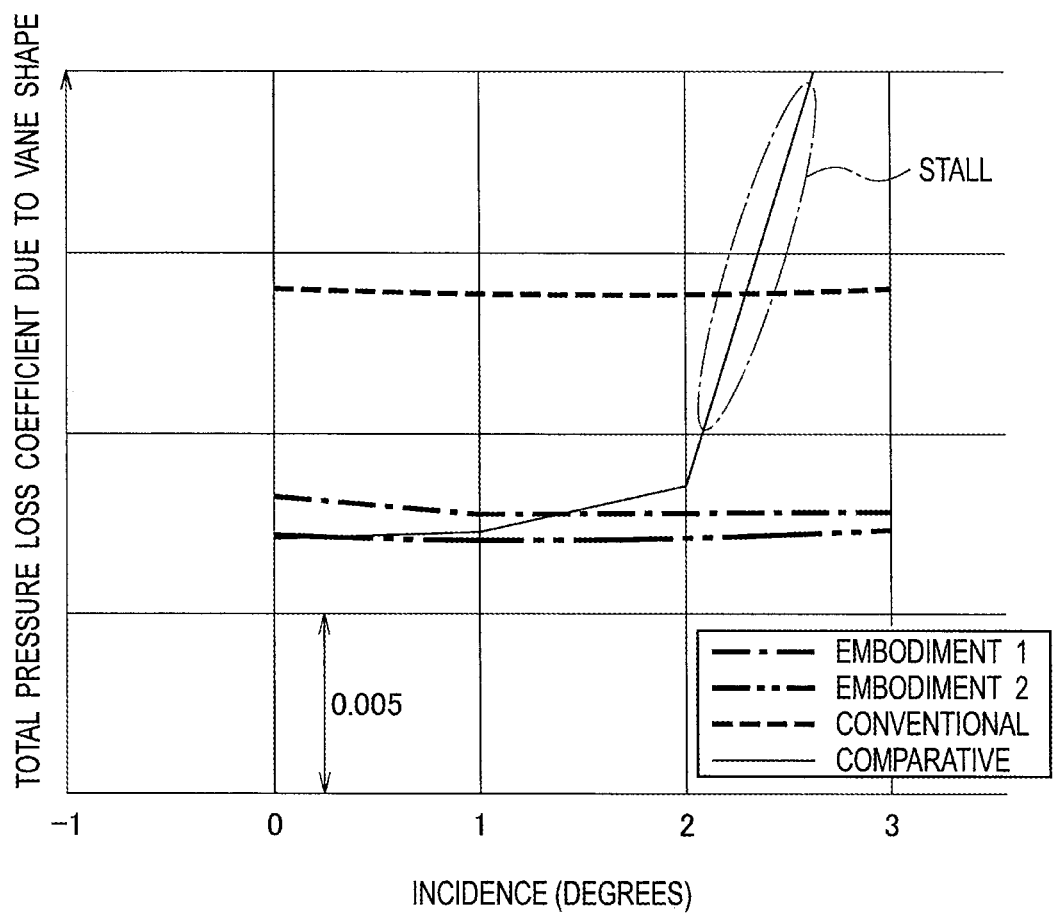
FIG. 7 is a diagram showing a relationship between a total pressure loss coefficient due to the vane shape and an incidence in embodiment 1, embodiment 2, the conventional example and comparative example 1.

When the axial flow compressor using the compressor stator vane according to embodiment 1 was operated (in the case of embodiment 1), when the axial flow compressor using the compressor stator vane according to embodiment 2 was operated (in the case of embodiment 2), when the axial flow compressor using the compressor stator vane according to the conventional example was operated (in the case of the conventional example) and when the axial flow compressor using the compressor stator vane according to comparative example 1 was operated (in the case of comparative example 1), Computational Fluid Dynamics analysis was performed on a relationship between a total pressure loss coefficient due to the vane shape and an incidence (an angle obtained by subtracting the entrance metal angle from the discharge angle) under the condition of the same discharge angle (specifically, the discharge angle was zero), and the results thereof summarized are shown in FIG. 7. Namely, it has been found that in the cases of embodiment 1 and embodiment 2, as compared with the case of the conventional example, it is possible to sufficiently reduce the total pressure loss due to the vane shape while preventing a stall. It can be considered that this is because in the cases of embodiment 1 and embodiment 2, a deviation was decreased and the peeling on the trailing edge side on the suction surface is suppressed as compared with the case of the conventional example. Note that it has been found that in the case of comparative example 1, the total pressure loss due to the vane shape can be reduced as compared with the case of the conventional example, but a stall is produced by increase in the incidence to thereby narrow the operation range. It can be considered that this is because the curvature of the suction surface of the compressor stator vane according to comparative example 1 on the side of the leading edge became excessive to thereby expand the peeling of the suction surface on the side of the leading edge.

Figure 8:
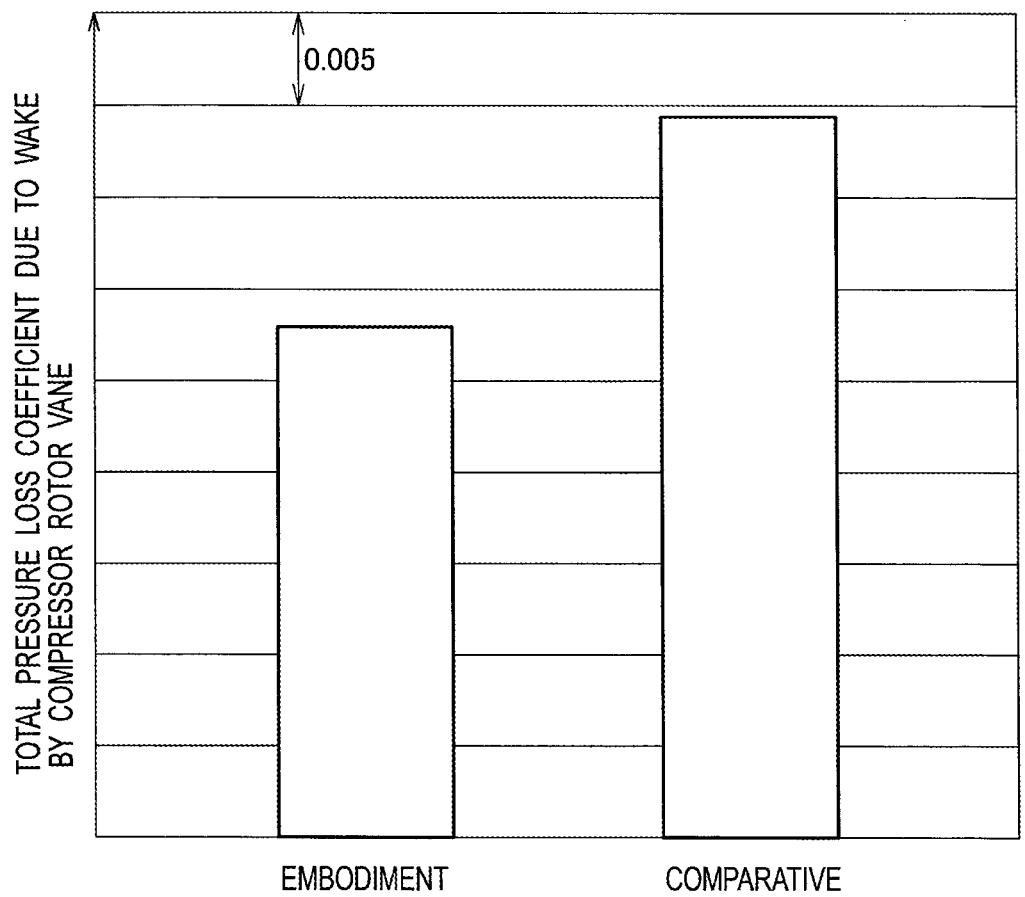
FIG. 8 is a diagram showing a total pressure loss coefficient due to the wake caused by a compressor rotor blade as the results of performance tests on an embodied product and a comparative product.

Under the conditions of the incidence being zero, performance tests were conducted on the axial flow compressor using the compressor stator vane according to embodiment 3 (the case of the embodied product) and on the axial flow compressor using the compressor stator vane according to comparative example 2 (the case of the comparative product), and the results thereof summarized on the total pressure loss coefficient due to the wake caused by the compressor rotor blade are shown in FIG. 8. Namely, it has been found that in the case of the embodied product, the total pressure loss due to the wake caused by the compressor rotor blade can be sufficiently reduced as compared with the case of the comparative example. It can be considered that this is because the compressor stator vane according to embodiment 3 increased the curvature of the suction surface on the side of the leading edge as compared with the compressor stator vane according to comparative example 2, and the attenuation action of the wake of the compressor rotor blade worked.

Namely, the results of the two Computational Fluid Dynamics analyses and the performance tests described above indicate novel findings that when the distance from the leading edge of the compressor stator vane to the camber reference point in the vane-shaped cross-section of the compressor stator vane is set to the 26-38% chord, it is possible to sufficiently reduce the total pressure loss due to the vane shape of the compressor stator vane and the total pressure loss due to the wake caused by the compressor rotor blade, while preventing the stall of the axial flow compressor.

What is claimed is:

1. A compressor stator vane for an axial flow compressor comprising:
   a vane-shaped cross-section provided from a first side of the compressor stator vane to a second side of the compressor stator vane in a radial direction, the vane-shaped cross-section having, on a camber line, a camber reference point in which a ratio of an angle obtained by subtracting an exit metal angle from a metal angle to a camber angle is 50%, wherein
   a distance from a leading edge to the camber reference point is set to a 26-38% chord,
   the metal angle refers to an angle formed by a tangential direction of the camber line and an axial direction at an arbitrary position on the camber line,
   the camber angle refers to an angle obtained by adding an entrance metal angle to the exit metal angle,
   the entrance metal angle refers to an angle formed by the tangential direction of the camber line and the axial direction at an leading edge of the compressor stator vane, and
   the exit metal angle refers to an angle formed by the tangential direction of the camber line and the axial direction at a trailing edge of the compressor stator vane.

2. An axial flow compressor that compresses a fluid along an axial direction, the axial flow compressor comprising:
   a cylindrical compressor case inside which an annular main flow path for circulating the fluid along the axial direction is formed;
   a plurality of stages of compressor rotors that are rotatably provided within the compressor case along the axial direction and that include: a compressor disc whose outer circumferential surface constitutes a part of a wall surface of the main flow path on an inner side in a radial direction and which can be rotated; and a plurality of compressor rotor blades which are provided at intervals on the outer circumferential surface of the compressor disc along a circumferential direction thereof and which are located within the main flow path; and
   a plurality of stages of compressor stators which are disposed alternately with the plurality of stages of compressor rotors within the compressor case along the axial direction and which include a plurality of compressor stator vanes that are arranged at intervals within the main flow path in the circumferential direction thereof and that rectify a flow of the fluid, wherein each of the compressor stator vanes of at least any stage of the compressor stator among the plurality of stages of compressor stators has a vane-shaped cross-section provided from a first side of the compressor stator vane to a second side of the compressor stator vane in a radial direction, wherein the vane-shaped cross-section has, on a camber line, a camber reference point in which a ratio of an angle obtained by subtracting an exit metal angle from a metal angle to a camber angle is 50%, and a distance from a leading edge to the camber reference point is set to a 26-38% chord, wherein the metal angle refers to an angle formed by a tangential direction of the camber line and an axial direction at an arbitrary position on the camber line, wherein the camber angle refers to an angle obtained by adding an entrance metal angle to the exit metal angle, wherein the entrance metal angle refers to an angle formed by the tangential direction of the camber line and the axial direction at an leading edge of the compressor stator vane, and wherein the exit metal angle refers to an angle formed by the tangential direction of the camber line and the axial direction at a trailing edge of the compressor stator vane.

3. A gas turbine that exhausts a high-temperature and high-pressure combustion gas to thereby generate a propulsion force or a rotating force, the gas turbine comprising an axial flow compressor according to claim 2.

* * * * *